C. Y. KNIGHT.
PISTON.
APPLICATION FILED SEPT. 28, 1910.
1,061,756.
Patented May 13, 1913.
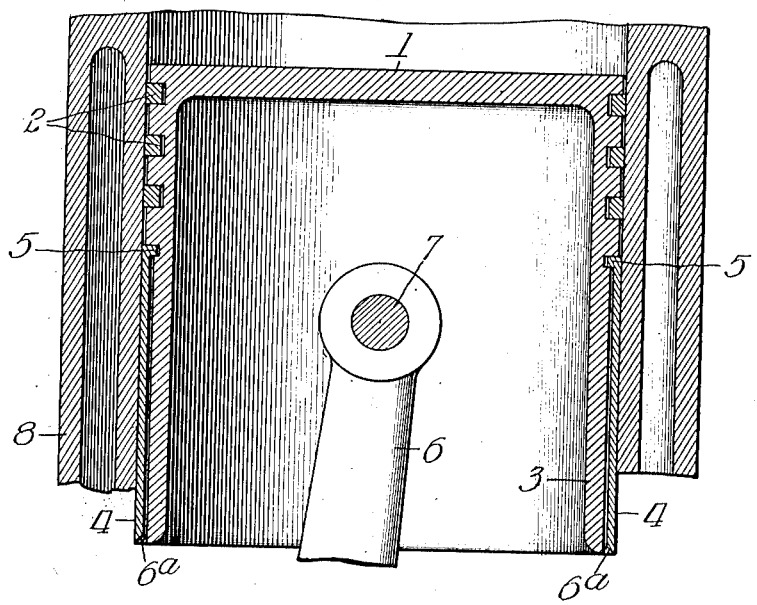
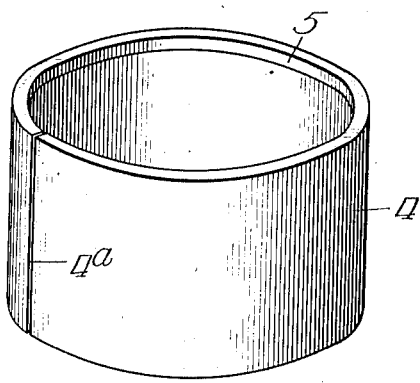
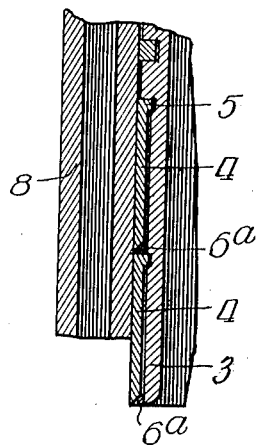

UNITED STATES PATENT OFFICE.

CHARLES Y. KNIGHT, OF COVENTRY, ENGLAND.

PISTON.

1,061,756.  Specification of Letters Patent.  Patented May 13, 1913.

Application filed September 28, 1910. Serial No. 584,179.

*To all whom it may concern:*

Be it known that I, CHARLES Y. KNIGHT, a citizen of the United States, residing at Broadwater, Kenilworth Road, Coventry, in the county of Warwick, England, have invented certain new and useful Improvements in Pistons, of which the following is a full, clear, and exact specification.

This invention relates to improvements in trunk pistons for engines, motors and other purposes.

A trunk piston is the type of piston comprising a head portion which is sometimes provided with one or more piston rings, usually of elastic metal, seated in peripheral grooves, and a trunk or body portion. Pistons of this character are usually employed where it is necessary or desirable to pivot the piston rod to the piston instead of securing it rigidly thereto as in cases where piston guide cross heads are secured to the piston rod for keeping the piston in perfect axial parallelism with the cylinder. Where the piston rod is thus pivoted to the piston, however, this trunk or body portion becomes necessary or desirable as a guiding means for insuring against any possible cocking action of the head portion, whose function it is to hold the pressure or compression, which it accomplishes either by greater accuracy of fit than the trunk possesses or through packing afforded by the piston rings where such are employed, the piston rings being usually omitted from the trunk or body portion.

Trunk pistons are employed in various kinds of engines or motors depending for their action upon the expansion or force of fluids, and also in some types of pumps or compressors, and to all of these the invention is applicable, but it is more particularly advantageous when used in connection with internal combustion motors in which the presence of this trunk or body portion of the piston, while being a necessity, has given rise to two main sources of difficulty. First, the long bearing surface of the trunk portion against the cylinder wall creating excessive friction, is difficult to lubricate because it must be sufficiently smaller in diameter than the bore of the cylinder to insure against seizure from overheating or lack of lubrication, and this clearance allows any leakage of the explosion to readily drive the oil out of the space between the trunk and the cylinder. Second, the necessary clearance between the trunk and the cylinder results in side thrust or lateral play of the trunk, due to the angularity of the piston-rod while the piston is under pressure, and this lateral play not only increases the friction with an attendant reduction in power, but results in a knocking sound which is seriously objectionable in a motor otherwise noiseless.

This invention is designed to avoid these defects, and it has for one of its important objects to provide means for preventing sound resulting from the side thrust of the piston.

Another object of the invention is to provide means for preventing the piston from seizing in the cylinder.

Still further objects of the invention will appear from the subjoined description and accompanying drawings showing an example of the invention in order that those skilled in the art may know how to construct and use the same, the scope of the invention, however, being particularly pointed out in the claims.

In the said drawings,—Figure 1 is an axial section of a piston embodying this invention. Fig. 2 is a detail perspective view of a collar or bushing employed in carrying out the invention; and Fig. 3 is a view similar to Fig. 1, showing one side of the piston with a modified form of the invention.

1 is the head portion of the piston which, in this example of the invention, is shown as being provided with a plurality of piston rings 2 of the usual or any suitable form for holding the pressure or compression, and 3 is the body or trunk portion of the piston, which is ordinarily of a diameter slightly less than the desired cylinder bore but which, in carrying out this invention, is made sufficiently less to make room between the wall of the cylinder and the circumference of the trunk for a collar or bushing 4. This collar or bushing is elastic, preferably possessing a greater or less tendency to spring outwardly or expand against the cylinder wall, and to that end, it is split axially throughout its entire length, as indicated at 4ª, so that it will be free to expand circumferentially when overheated without expanding radially or objectionably increasing its normal diameter to a degree resulting in seizure or serious friction against the cylinder wall. The parts are also so proportioned and arranged that there will be a slight or capillary space between the inner face of the collar or bushing 4 and the circumference of the trunk 3 to provide for a film of oil continually between these faces. The important function of such a film of oil is to cushion the impact of the trunk 3 against the bushing 4 when the trunk receives lateral thrust, with the obvious advantage that the objectionable sound and the loss of power occasioned by the increased friction as the inevitable sequel to such impact are avoided, while the collar or bushing 4, aided by this film of oil, holds the piston more accurately in line with the axis of the cylinder than heretofore, since the oil itself serves as a yielding filling, while the elastic nature of the bushing enables it to fit the cylinder wall more accurately and with greater snugness than would be safe with the rigid surface of the trunk. It is also seen that the faces of the trunk and the collar or bushing being relatively fixed, the film of oil between them is not liable to be rubbed out by friction as heretofore.

The collar or bushing 4 may be supported upon the piston in any appropriate way. In this example of the invention the object is accomplished by providing the two parts with interlocking features, the piston being provided with a circumferential groove a suitable distance below the bottom piston ring, and the upper end of the collar or bushing with an internal circumferential flange 5 which springs into said groove as the collar or bushing is slipped over the trunk of the piston. It is also preferable to provide the parts with means whereby the motion of the piston will induce the lubricant to find its way between the trunk of the piston and the bushing. For that purpose the lower end of the bushing is shown with a beveled edge $6^a$ around its inner side, so formed that it will scrape lubricant from the wall of the cylinder and direct it into the space between the bushing and the trunk. The thickness of the sleeve or bushing 4 will of course vary with the diameter of the piston, but in all cases it is desirable to have it sufficiently thin to make it elastic while being stout enough to withstand the wear.

With a piston thus constructed, it will be seen that seizure within the cylinder is not liable to occur unless possibly through total failure of lubrication and overheating, but in case it does occur the damage would be mostly to the bushing or collar 4 and not to the piston, to the cylinder wall or to the crank or the connecting rod or other more important or costly part of the mechanism, because the strain on the piston would cause the flange 5 to break off and allow the trunk portion of the piston, whose surface has not been rubbed dry by friction, to pull out of the bushing and work free with the crank.

6 is the piston rod, 7 its pin and 8 the cylinder wall, all of which may be of any suitable construction.

In the modification shown in Fig. 3, the bushing is comprised of a plurality of collars, each having one of the retaining flanges 5.

What I claim is:

1. In a device of the class described the combination of a piston proper having its diameter reduced throughout a portion of its length, a split collar surrounding the piston at said reduced portion, and interlocking provisions provided on said collar and piston for causing the collar to travel with the piston.

2. In a device of the class described the combination with a piston provided with a head having pressure retaining provisions and a trunk of smaller diameter than said head, of an elastic axially elongated split collar or bushing surrounding the said trunk and movable therewith for retaining around the trunk a film of lubricant.

CHARLES Y. KNIGHT.

Witnesses:
 ERNEST HARKER,
 ETHEL M. WEBB.